United States Patent Office 3,737,334
Patented June 5, 1973

3,737,334
VULCANIZED RUBBER COMPRISING A SILICEOUS PIGMENT, A RUBBER AND AN ORGANIC COUPLING AGENT HAVING AN ACTIVE OLEFINIC LINKAGE
Thomas J. Doran, Norton, Melvin P. Wagner, Barberton, and Henry C. Stevens, Akron, Ohio, assignors to PPG Industries, Inc., Pittsburgh, Pa.
No Drawing. Original application July 7, 1969, Ser. No. 839,644, now Patent No. 3,664,403. Divided and this application Jan. 14, 1972, Ser. No. 217,973
Int. Cl. C09c 1/28; B60c 5/00; C08d 13/20
U.S. Cl. 106—288 Q          4 Claims

ABSTRACT OF THE DISCLOSURE

The novel rubber compound and tire tread made therefrom include a silica-filled unsaturated rubber compound and a reactive olefinic coupling agent such as 5-triethoxysilyl norbornene. The coupling agent is a compound which forms a bond or connection between the rubber polymer and the silica.

---

This is a division, of application Ser. No. 839,644 filed July 7, 1969, now U.S. Pat. 3,644,403.

This invention relates to unsaturated rubber compounds and tire treads and, more specifically, this invention relates to silica-reinforced unsaturated rubber compounds and tire treads.

Previously known silica-reinforced rubber compounds provided certain highly desirable characteristics; for example, silica-reinforced rubber tires are known to have good resistance to tearing, cutting, flex cracking, aging and skidding. In addition, silica imparts a light color to the tires. Thus, white or colored tires may be made from silica-reinforced vulcanizates.

The present invention provides a silica-reinforced rubber compound which retains the basic advantages previously recognized by the art and further possesses a very significant increase in wear resistance as compared with previous silica-reinforced rubber compounds. In addition, the present invention provides substantial improvement in other characteristics over previous silica-reinforced rubber compounds; for example, improved cure time, viscosity, modulus values, tensile strength, compression set, and hysteresis or heat build-up.

The rubber compound of the present invention includes a finely-divided reinforcing siliceous pigment, a coupling agent, and a rubber polymer. Furthermore, the rubber compound may contain any of the various additives conventionally included in rubber compounds, such as typically used in making tire treads, for example, accelerators (e.g., guanidines), activators (e.g., zinc oxide), oil extenders (e.g., a mixture of 76 percent aromatic hydrocarbons and 26 percent naphthenic hydrocarbons manufactured and sold by Sun Oil Company under the trademark Sundex 53), curatives (e.g., sulfur), etc.

The present invention principally contemplates rubber compounds for mechanical rubber goods such as belting, motor mounts and tires. The rubber compound of the present invention is especially desirable for use in tire treads for pneumatic tires and treads for other types of tires. The present invention principally contemplates the type of unsaturated rubber polymers or elastomers typically used in tire treads; for example, styrene butadiene rubber, butadiene rubber, and natural rubber. However, the broader aspects of the present invention are applicable to other types of unsaturated rubber such as EPDM rubber. The rubber polymers used in the present invention preferably should have at least 4 mole percent unsaturation and may have in excess of 70 mole percent unsaturation and may be as high as 100 mole percent unsaturation. Typical styrene butadiene rubber has about 75 to 80 mole percent unsaturation.

The siliceous pigments preferably employed in this invention are precipitated, hydrated silica and are obtained by the precipitation of a soluble silicate, for example, silica, produced according to the method described in U.S. Pat. No. 2,940,830. These pigments have an $SiO_2$ content of at least 50 percent and usually greater than 80 percent by weight on an anhydrous basis. The siliceous pigment should have an ultimate particle size in a range of 50 to 10,000 angstroms, preferably between 50 and 400 and, more preferably, between 150 and 300 angstroms. The BET surface area of the pigment as measured used nitrogen gas is preferably in the range of 50 to 600, usually 70 to 300 square meters per gram. The BET method of measuring surface area is described in the Journal of the American Chemical Society, vol. 60, page 304 (1930). A typical commercial form of such reinforcing siliceous pigment is manufactured and sold by PPG Industries, Inc., under the trademark Hi-Sil 233.

According to the present invention, it has been found that excellent rubber compounds and especially rubber tire treads can be prepared by the addition of a coupling agent to the rubber composition.

A coupling agent is a material that forms a connection or bond between, in this case, silica and rubber. The present invention is directed to the use of an active olefinic compound such as 5-triethoxysilylnorborne, isoprene-triethoxysilane adduct, 4(triethoxysilyl ethyl)cyclohexene, 6-triethoxysilyl-2-ethylidene norbornane, or 5-triethoxysilyl-2-ethylidene norbornane as the coupling agent.

The coupling agent used in the present invention is a difunctional compound which may be represented by a general formula of the type A–B. A presents a functional group that is capable of chemically or physically bonding to a silica particle, such bond preferably being between a silicon atom of the coupling agent and an oxygen atom of the silica particle. In the broader aspects of the present invention, functional group A may provide a bond through any member of Group IV in the Periodic Table, particularly carbon, silicon, germanium and tin. Alternatively, the bond may be through a member of Group V in the Periodic Table, especially nitrogen or phosphorous. Furthermore, the bond may be through any multivalent element in rows 2 and 3 in the Periodic Table, especially oxygen and sulfur. B represents a functional group that is capable of chemically or physically bonding to the rubber polymer, such bond being between a carbon atom and the rubber polymer.

Group A is a group that will provide a multivalent atom which is bonded to group B and which will bond with the silica particle. For example, the coupling agent A–B may include a group A as follows:

$$B-D-X_{(d-1)}$$

The letter designations will have the same meaning whenever used herein. D is any member selected from Groups IV or V in the Periodic Table, especially carbon, silicon, germanium, tin, nitrogen or phosphorous, or any multivalent element in rows 2 or 3 in the Periodic Table, especially oxygen and sulfur: X is any moiety that will react with the silanols present in the silica, thereby permitting the multivalent atom of the coupling agent to bond to an oxygen atom of the silica. X can be, for example, a halide. Alternatively, X can be an oxy-group OR'. R' is H, alkyl, cycloalkyl, aryl, aralkyl, alkaryl, or acyl group, or a member of these groups bearing substituents such as one of the halides. R' is preferably a hydrocarbon group containing between 1 and 10 carbon atoms. The letter $d$ is equal to the valence of D.

The preferred group A is a silane group or any group that will provide a silicon atom that bonds with the silica particle. The coupling agent A–B may include a group A as follows:

(1)
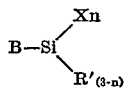

The letter $n$ is 1, 2 or 3. The functional group A is preferably trimethoxysilyl —Si(OCH$_3$)$_3$ or triethoxysilyl —Si(OCH$_2$CH$_3$)$_3$.

Furthermore, the functional group A could be as follows:

(2)
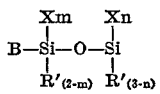

preferably,

B—Si—O—Si(OCH$_3$)$_3$ with OCH$_3$ groups wherein $m$ is 1 or 2

(3)
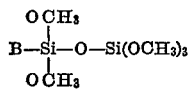

preferably,

B—Si—N—Si(OCH$_3$)$_3$ with OCH$_3$ groups preferably, (4)
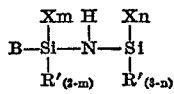

preferably,

B—Si—O—Si—B with OCH$_3$ OCH$_3$ groups (5)
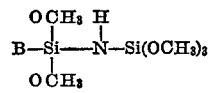

preferably,

B—Si—N—Si—B with OCH$_3$ H OCH$_3$ groups

In the broader aspects of the present invention, group A would include other functional groups capable of forming a stable bond with a silica particle.

Group B is an olefin including an active olefinic linkage. As used herein with respect to the coupling agent, the term "active olefinic linkage" means an olefin having an internal double bond or, in other words, the carbon atoms of the double bond are other than terminal carbons. The active olefinic linkage is an olefinic linkage that is more reactive than that of ethylene. The reactivity of the olefinic linkage should compete favorably with the reactivity of the olefinic linkage in the rubber polymer. The more active the olefinic linkage of the coupling agent, the more effective is the coupling agent. Several factors affect the activity of the olefinic linkage of the coupling agent. For example, with open-chain olefins, the amount of substitution on the carbon atoms of the double bond is of importance. Preferably, such carbon atoms each have at least one methyl group attached thereto. Although the hydrogen atoms themselves may not enter into the reaction, yet the greater the number of allylic hydrogens, the more active will be the olefinic linkage. Certain cyclic olefins provide more active olefinic linkages than do open-chain olefins. The olefinic linkage is especially active if the double bond suffers angle strain such as in a norbornene or cyclobutene. This degree of strain can be measured as in the work of R. B. Turner, W. R. Meador and R. E. Winkler, Journal of the American Chemical Society, vol. 79, page 4116 (1957). In any event, the activity of the olefinic linkage of the coupling agent must be sufficiently great to result in a bonding between the coupling agent and the rubber polymer upon vulcanization. When the coupling agent is reacted with the rubber polymer, one bond of the double bond breaks such that the carbon atom bonds directly with the rubber polymer. The following groups are typical of those that would provide such a reactive olefinic linkage:

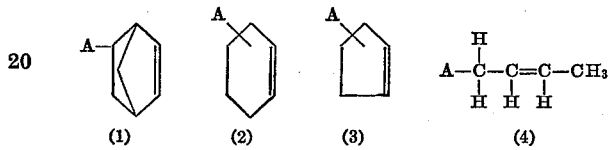

Preferred examples of the coupling agent of the present invention are:

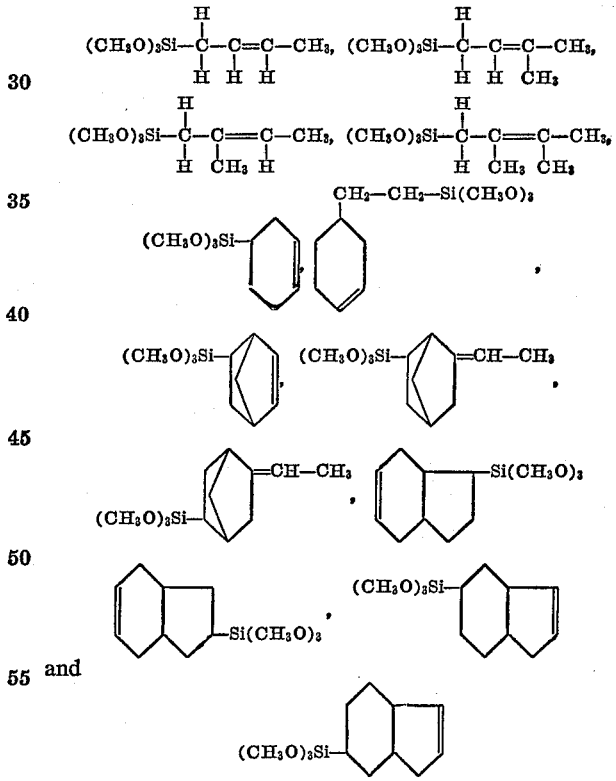

and (CH$_3$O)$_3$Si—

Unless otherwise indicated, the hereinafter-described ingredients will be stated as parts by weight. Furthermore, the formulations will be based on 100 parts of rubber. Typically, the rubber composition used in the tire treads of the present invention may include 100 parts of rubber, such as a styrene-butadiene rubber; 5 to 100 parts of silica (preferably 40 to 90 parts), such as Hi-Sil 233 (trademark of PPG Industries, Inc.) reinforcing siliceous pigment; 0.1 to 15 parts coupling agent (preferably 0.3 to 3 parts), such as 5-triethoxysilyl-norbornene; and conventional sulfur or peroxide curatives. The sulfur curative may include 0.5 to 3 parts sulfur, 2 to 5 parts zinc oxide, and 0.5 to 2 parts accelerator. A peroxide curative may include 1 to 4 parts dicumyl peroxide, such as Dicup 40C (trademark of Hercules Powder Company, Inc.). Although not essential, other conventional rubber additives are not detrimental. Other conventional rubber additives would include carbon blacks, oils, plasticizers, antioxidants, and colors.

The coupling agent can be added in any of several stages of rubber compounding. For example, satisfactory rubber compositions can be obtained when the difunctional organic compound, preferably a trialkoxysilyl olefin, is reacted with the silica prior to incorporating the silica into the rubber batch such as by coating the silica with the coupling agent. Satisfactory rubber compositions can also be obtained when the coupling agent is incorporated into a co-precipitated silica latex masterbatch. The coupling agent can be reacted with the rubber prior to incorporation of the silica therein or it can be added to the rubber batch together with silica and various other additives during the Banbury mixing. The coupling agent may be in any one of several forms when it is reacted with the rubber or silica; for example, it may be in the vapor state. Alternatively, it can be added in a substantially pure state, dissolved in an organic solvent, or dissolved or suspended in water.

Preferably, the coupling agent is permitted to react with the silica and the rubber prior to the incorporation of any of the polar additives, particularly metal soaps, metal oxides (especially zinc oxide), amines, glycols, and accelerators (especially guanidine) into the rubber batch. The following example is illustrative of the present invention.

EXAMPLE I

Rubber Compounds I-A and I-B were prepared according to the following formulations. Rubber Compound I-A is a preferred example of the present invention. The ingredients shown in Table I were mixed in a Banbury for about 5 minutes at a temperature of between 300° F. and 320° F. Rubber Compound I-A typically illustrates a rubber compound used in the tire treads of the present invention. Rubber Compound I-B is a control compound and did not contain a coupling agent. Carbon black (S-300 Black) was added to both compounds for the purpose of coloring.

TABLE I

| Rubber compounds | I-A | I-B |
| --- | --- | --- |
| Ingredients (parts by weight): | | |
| SBR 1502 [1] | 98 | 98 |
| Hi-Sil 233 [2] | 60 | 60 |
| Sundex 790 [3] | 10 | 10 |
| Stearic acid | 2 | 2 |
| Phenyl-beta-naphthylamine | 1 | 1 |
| Flexamine G [4] | 1 | 1 |
| S-300 Black | 1 | 1 |
| 5-triethoxysilylnorbornene | 2.4 | |

[1] Standard ASTM designation. Approximately .75 mole percent unsaturation.
[2] Trademark, PPG Industries, Inc. A precipitated, hydrated silica having an ultimate particle size of 200 angstroms, a BET surface area of approximately 150 square meters per gram, and containing $SiO_2$, 87.5%; CaO, 0.75%; $R_2O_3$, 0.95%; NaCl, 1.6%; a weight loss at 105° C. of 6.3%; and the balance is bound water.
[3] Trademark, Sun Oil Company. An aromatic oil.
[4] Trademark, United States Rubber Company. A physical mixture containing 65% of a complex diarylamine ketone reaction product and 35% of a commercial N,N'-diphenyl-p-phenylene diamine.

The rubber batch was further mixed on an open mill and the ingredients shown in Table II were added. The mixing on the mill was continued for about 10 minutes at 180° F.

TABLE II

| | I-A | I-B |
| --- | --- | --- |
| 2,2-benzothiazole disulfide | 1.5 | 1.5 |
| Di-ortho-tolylguanidine | 1.5 | 1.5 |
| Sulfur | 2.75 | 2.75 |
| ZnO Master (containing ⅓ SBR 1502 and ⅔ zinc oxide) | 6 | 6 |

The resulting compounds had the following characteristics:

TABLE III

| Compound | 90% cure (min.) | 212° F., viscosity,[1] ML 4' | Heat build-up [2] | Compression set [3] | Pico Abrasion index [4] | Road wear index [5] |
| --- | --- | --- | --- | --- | --- | --- |
| I-A | 38.0 | 105 | 51 | 14 | 93 | 121 |
| I-B | 41.0 | 168 | 88 | 25 | 84 | 100 |

[1] Tested according to ASTM D-1646.
[2] Tested according to ASTM D-623 Method A.
[3] Tested according to ASTM D-395 Method B.
[4] Tested according to ASTM D-2228-63T.
[5] Tested by Three-T Fleet, Inc., substantially as described in Pat. No. 3,397,583. The results are accurate to within 5 points.

In determining the Road Wear Index, a tread band or portion was prepared of the Rubber Compounds I-A and I-B. The tread bands were applied to a new tire carcass. The tire cure included preheating the rubber compounds for 35 minutes at 210° F., then placing same in the mold for 17 minutes at 331° F. The tire was mounted on an automobile which was driven at 70 miles per hour on a hard-surfaced road for 4400 miles. The road traveled was flat and included a combination of curved portions and straight portions. This test is designated as being a combination of slow and fast wear. The amount of tread lost during the test is determined and the Road Wear Index shows a comparison of the wear of each of the tread bands using the control compound as the standard of reference. The tire size was 7.35 by 14 inches. The load was 1160 pounds per square inch on each tire. The tires were inflated to 32 pounds per square inch gauge.

The following table shows further characteristics of Rubber Compounds I-A and I-B.

TABLE IV
[Compounds Cured for 30 Minutes at 300° F.]

| Compound | Modulus at 300% elongation (p.s.i.)[1] | Tensile strength (p.s.i.)[1] | Hardness (Shore A)[2] |
| --- | --- | --- | --- |
| I-A | 940 | 3,200 | 72 |
| I-B | 710 | 1,850 | 73 |

[1] Tested according to ASTM D-412.
[2] Tested according to ASTM D-314.

Tables III and IV show that the Rubber Compound I-A has substantially improved characteristics for tire tread. The improved characteristics include cure time, viscosity, tensile strength, modulus values, compression set, Pico Abrasion Index, and Road Wear Index. The improved Road Wear Index is of particular importance. Examination of the Road Wear Index values shows that the Rubber Compound I-A, which is one preferred embodiment of the present invention, has a resistance to road wear about 20 percent greater than the Road Wear Index of Compound I-B which is a silica-reinforced rubber compound without the coupling agent.

EXAMPLE II

The following example illustrates the effectiveness of several different coupling agents in rubber compounds in which the rubber polymer is a very highly unsaturated rubber polymer, namely, a styrene-butadiene rubber. The rubber compounds were prepared by mixing 100 parts SBR 1502 and 60 parts Hi-Sil 233 (trademark of PPG Industries, Inc.) in a Banbury for about 5 minutes at a temperature of between 300° F. and 320° F. The rubber batch was further mixed on an open mill for about 10 minutes at 180° F. During mixing on the mill, the following ingredients were added: 1 part phenyl-beta-naphthylamine; 4 parts zinc oxide; 0.75 part benzothiazole disulfide; 1.25 parts di-ortho-tolylguanidine and 2.50 parts sulfur. Compound II-A was a control compound and did not contain a coupling agent. The Rubber Compounds II-B through II-E each further included a coupling agent which was added during Banbury mixing. The coupling agents used were as follows: Compound II–B contained 1.57 parts of 5-triethoxysilylnorbornene

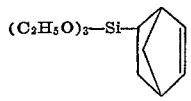

Compound II–C contained 1.42 parts of isoprene-triethoxysilane adduct

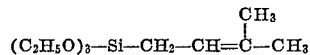

Compound II–D contained 1.66 parts 4-(triethoxysilyl ethyl)cyclohexene

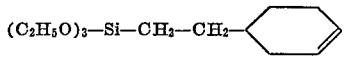

Compound II–E contained 1.74 parts triethoxysilyl-2-ethylidene norbornane

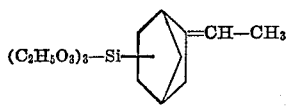

The resulting compounds had the following characteristics when tested according to the standard ASTM procedures.

| Compound | Pico abrasion index | Tensile, p.s.i. | 300% modulus, p.s.i. | 100% modulus, p.s.i. |
|---|---|---|---|---|
| II–A (control) | 75 | 3,230 | 805 | 330 |
| II–B | 88 | 3,510 | 1,110 | 360 |
| II–C | 83 | 3,630 | 1,050 | 350 |
| II–D | 85 | 3,570 | 980 | 335 |
| II–E | 84 | 3,550 | 1,020 | 350 |

The above table shows that the present invention provides a substantial improvement in abrasion resistance, tensile strength and modulus values over previous silca-filled styrene-butadiene rubber. For example, Compound II–B shows an improvement over the control Compound II–A of more than 17% in the Pico Abrasion Index and nearly 40% in 300% modulus.

EXAMPLE III

The following example illustrates the effectiveness of various coupling agents in an ethylene propylene rubber polymer. The ethylene propylene rubber polymer used was EPDM [1] Epsyn-40-A [2] which has an unsaturation of about 4 mole percent. The rubber compounds were each prepared by mixing 100 parts of rubber polymer with 50 parts of Hi-Sil 233 (trademark of PPG Industries, Inc.) on a Banbury at 310° F. for 5 minutes. The rubber batch was further mixed on an open mill for about 10 minutes at 180° F. During mixing on the mill, the following ingredients were added: 1 part phenyl-beta-naphthylamine; 5 parts zinc oxide; 1.0 part stearic acid; 1.75 parts zinc dibutyl dithiocarbamate; 0.45 part tetraethylthiuram disulfide; 2.0 parts sulfur and 0.5 part benzothiazole disulfide. Since Compound III–A was a control compound, it did not contain a coupling agent. The Rubber Compounds III–B through III–D each further included a coupling agent which was added during Banbury mixing. The coupling agents used were as follows: Compound III–B contained 1.54 parts of 5-triethoxysilyl norbornene. Compound III–C contained 1.67 parts of 4-(triethoxysilyl ethyl)cyclohexene. Compound III–D contained 1.74 parts of triethoxysilyl-2-ethylidene norbornane. The resulting compounds had the following characteristics when tested according to the aforedescribed ASTM procedures.

[1] ASTM designation.
[2] Trademark of CoPolymer and Chemical Corporation.

| Compound | Pico abrasion index | Tensile, p.s.i. | 300% modulus, p.s.i. | 100% modulus, p.s.i. |
|---|---|---|---|---|
| III–A (control) | 93 | 2,470 | 730 | 375 |
| III–B | 130 | 3,800 | 1,720 | 580 |
| III–C | 136 | 3,740 | 2,060 | 630 |
| III–D | 142 | 4,000 | 1,940 | 650 |

The above table illustrates that ethylene propylene rubber compounds containing the coupling agent of the present invention have improved properties of abrasion resistance, tensile strength, and modulus. For example, the Rubber Compound III–D, containing triethoxysilyl-2-ethylidene norbornane had a Pico Abrasion Index which was more than 50% greater than that of the control Compound III–A.

Although the present invention has been described with reference to the specific details of particular embodiments thereof, it is not intended thereby to limit the scope of the invention, except insofar as the specific details are recited to the appended claims.

We claim:
1. A composition for reinforcing an unsaturated rubber polymer comprising the reaction product of a finely-divided, reinforcing, siliceous pigment and an organic coupling agent having the general formula A–B, wherein A represents a functional group capable of reacting to bond to the siliceous pigment and B represents a functional group capable of reacting to bond to the unsaturated rubber polymer, said functional group B being an active olefinic linkage having an internal double bond wherein the amount of coupling agent is between 0.1 and 15 per 5 to 100 parts silica said composition adaptable for use in 100 parts of rubber polymer.

2. The composition of claim 1 wherein the coupling agent is a member selected from the group consisting of

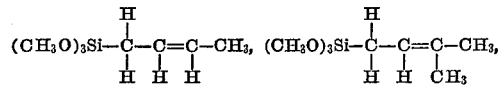

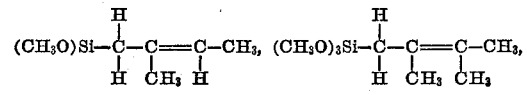

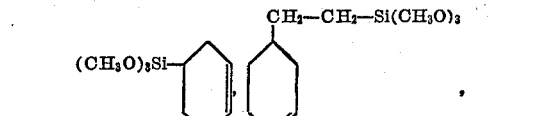

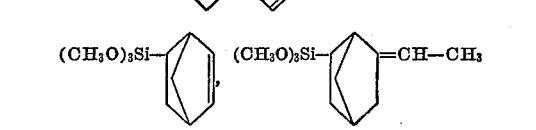

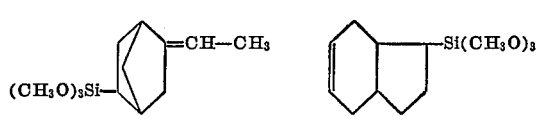

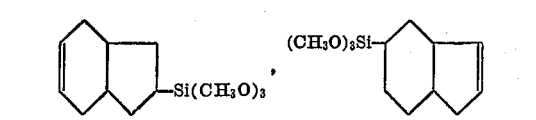

and

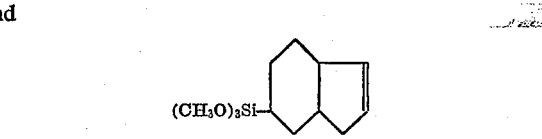

3. The composition of claim 1 wherein the coupling agent is a member selected from the group consisting of 5-triethoxysilyl norbornene, isoprene-triethoxysilane adduct, 4-(triethoxysilyl ethyl)cyclohexene, 6-triethoxysilyl- 2-ethylidene norbornane, and 5-triethoxy-silyl-2-ethylidene norbornane.

4. The composition of claim 1 wherein the silica has an $SiO_2$ content greater than 80 percent by weight on an anhydrous basis, an ultimate particle size between 150 and 300 angstroms and a BET surface area as measured using nitrogen gas in the range of 70 to 300 square meters per gram.

References Cited
UNITED STATES PATENTS

| | | | |
|---|---|---|---|
| 2,742,378 | 4/1953 | Te Grotenhuis | 106—307 |
| 2,834,693 | 5/1956 | Jellinek | 260—448.8 R |
| 3,075,948 | 1/1963 | Santenni | 260—448.8 R |
| 3,290,165 | 12/1966 | Iannicelli | 106—288 B |
| 3,443,620 | 5/1969 | Vanderbilt et al. | 152—330 |

OTHER REFERENCES

Kraus: Reinforcement of Elastomers (Interscience) (N.Y.) (1965), page 417.

MORRIS LIEBMAN, Primary Examiner

H. H. FLETCHER, Assistant Examiner

U.S. Cl. X.R.

106—308 Q, 309; 152—330; 260—41.5 A, 448.8 R

UNITED STATES PATENT OFFICE
CERTIFICATE OF CORRECTION

Patent No. 3,737,334     Dated June 5, 1973

Inventor(s) Thomas J. Doran, Melvin P. Wagner, Henry C. Stevens

It is certified that error appears in the above-identified patent and that said Letters Patent are hereby corrected as shown below:

Column 8, line 29, after "group B", "being" should be deleted and insert --including--

Column 8, line 30, "active olefinic linkage" should be deleted and insert --olefin--; after "bond" insert comma (,)

Column 8, line 31 after "agent" insert --used--

Column 8, line 32 after "15" insert --parts--; "silica" should be deleted and insert --siliceous pigment,--; after "composition" insert --being--

Column 9, line 3 "silica" should be deleted and insert --siliceous pigment--

Signed and sealed this 15th day of January 1974.

(SEAL)
Attest:

EDWARD M. FLETCHER, JR.        RENE D. TEGTMEYER
Attesting Officer              Acting Commissioner of Patents